Sept. 26, 1967  G. B. HUNT  3,343,884
METHOD OF MAKING SPIRAL WOUND BRUSHES
Filed March 31, 1965  2 Sheets-Sheet 2
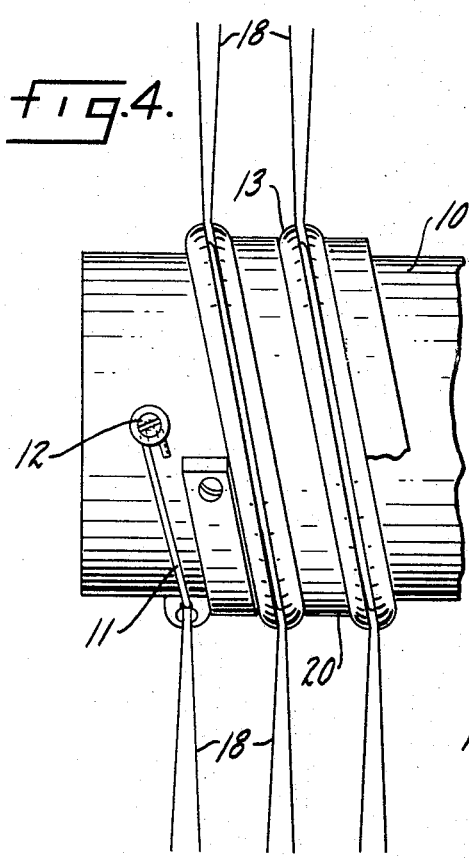
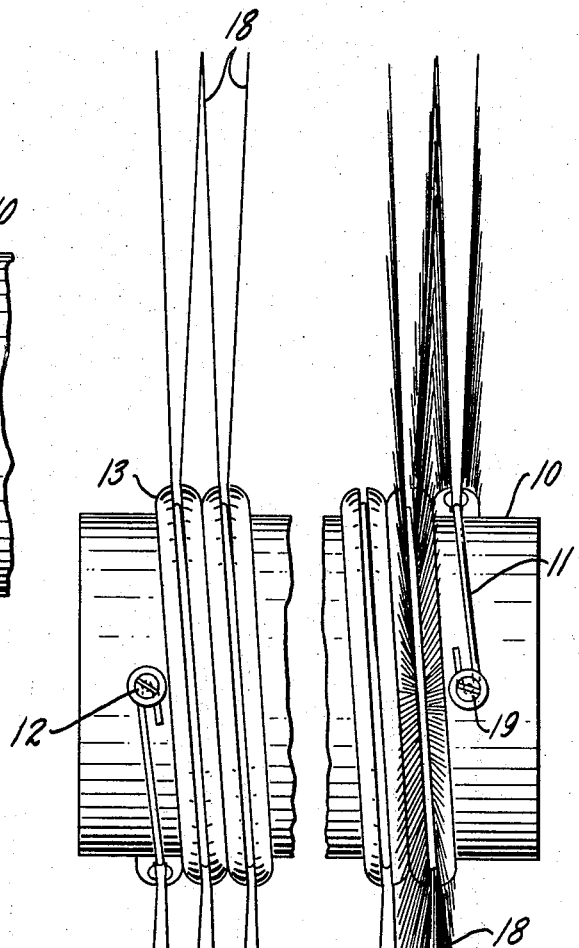
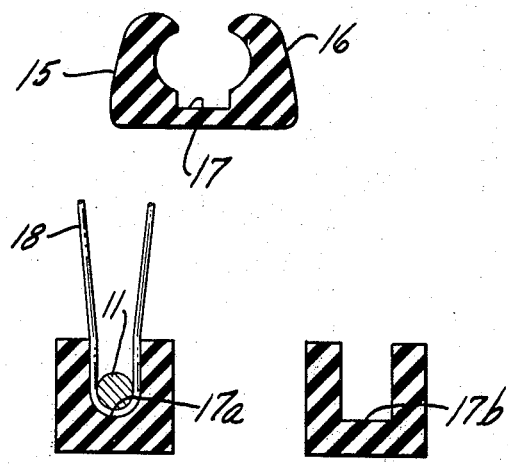
INVENTOR.
George B. Hunt,
BY Malcolm A. Bradway
Attorney.

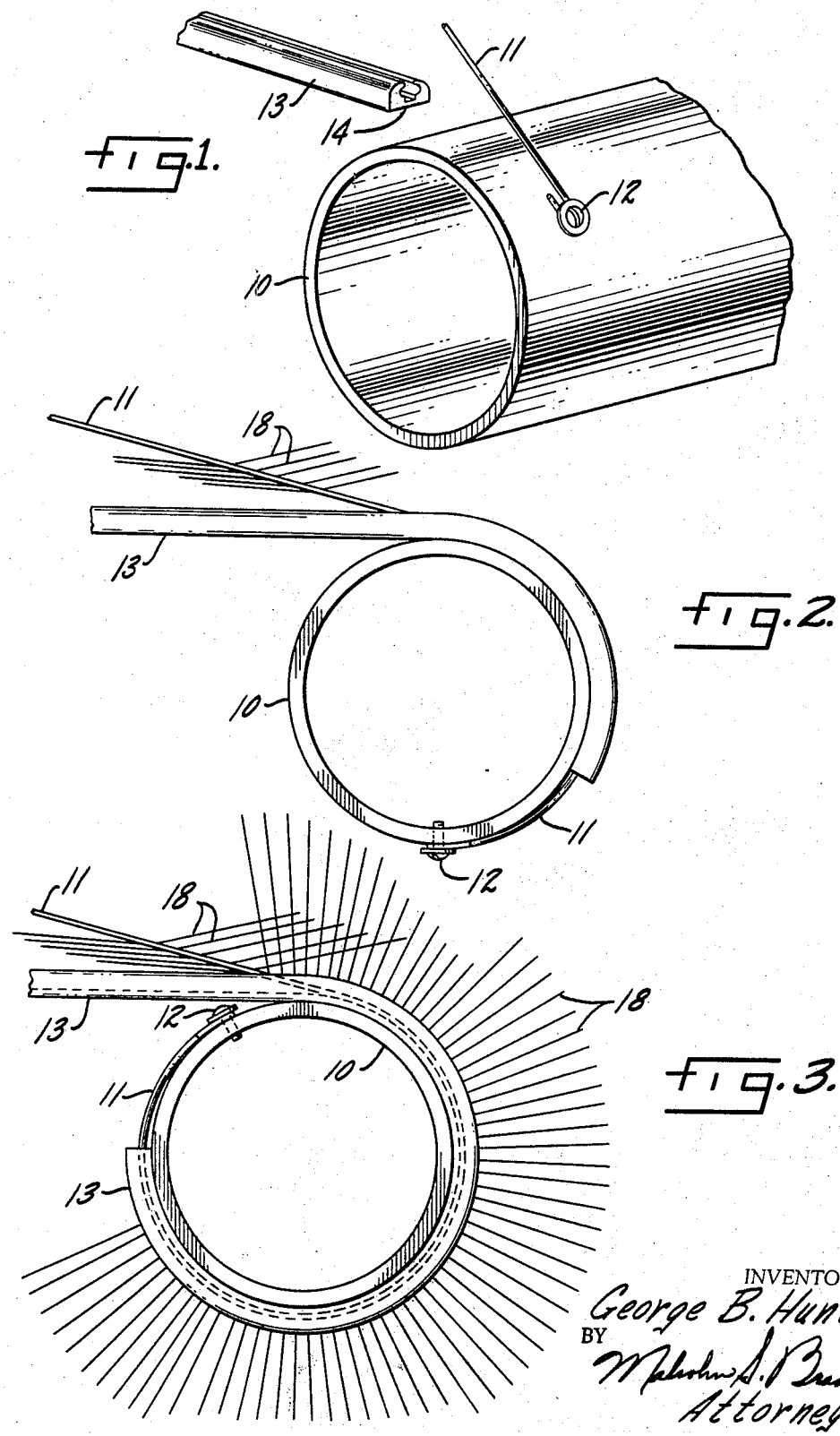

United States Patent Office 3,343,884
Patented Sept. 26, 1967

3,343,884
METHOD OF MAKING SPIRAL WOUND BRUSHES
George B. Hunt, 648 N. 79th St.,
Wauwatosa, Wis. 53213
Filed Mar. 31, 1965, Ser. No. 444,356
6 Claims. (Cl. 300—21)

ABSTRACT OF THE DISCLOSURE

The method of making a spiral wound brush in which the cord which is used to hold brush filaments in place in a channel is used also to determine the position of the channel and to hold the channel on a brush core.

---

The present invention is directed to the art of spiral wound brushes and is particularly concerned with improvements which facilitate manufacture of such brushes.

Spiral wound brushes of various kinds and sizes have been manufactured for many years. Heretofore, spiral wound brushes have consisted typically of a cylindrical body with a groove formed in the body or in a separate spirally wound grooved member which is fixed to the body. After the groove is formed on the body, a cord is wound around the groove with brush filaments between the cord and the bottom wall of the groove. When the cord is drawn tightly into the groove, the brush filaments are bent by the conjoint action of the walls of the groove and the cord and extend outwardly from the brush body at approximately 90° from the axis of the body. In the past, grooves have been cut into the body and, in some cases, a special spirally wound U-shaped member is fixed, as by welding or the like to the cylindrical body or core. In the case of grooves being cut into the cylindrical body the pitch and location of the spiral is determined by the facilities used to form the spiral. In the case of a separate grooved spiral member the pitch and location is determined by the facilities used to attach the spiral groove to the cylindrical body. In neither case can the location and pitch of the spiral groove be determined by the facilities used to wind the cable or cord within the spiral groove while at the time the brush filaments are folded into the groove.

With the foregoing in mind, the major purposes of the present invention are to so form a spirally wound brush that the same brush filament holding groove facility can be utilized with a core of wood, metal or other material; to so form a spirally wound brush that no special cutting tools are necessary to form a spiral groove in the body and no specially formed spiral member is necessary in making the brush, the brush being so formed that the pitch of the spiral may be varied from time to time with the same facilities thereby enabling a variance in the spacing of the brush filaments in accordance with predetermined desires in the finished brush, the method of making the brushes being capable of utilization in varied sizes of brushes at lesser expenses than has been involved heretofore in the manufacture of spiral brushes, these and other purposes of the invention being more apparent in the course of the ensuing specification and claims when taken with the accompanying drawings, in which:

FIGURE 1 is a diagrammatic illustration of an initial step in making brushes according to the present invention;

FIGURE 2 is a diagrammatic illustration of additional steps utilized with the method of the present invention;

FIGURE 3 is a diagrammatic illustration of further steps employed according to the present invention;

FIGURE 4 is a diagrammatic view of a brush formed in accordance with the present invention;

FIGURE 5 is a side view of a typical spirally wound brush formed in accordance with the present invention;

FIGURE 6 is a sectional view of a typical groove strip utilized in the invention; and FIGURE 7 illustrates other cross sections of other grooved strips which may be utilized in the invention.

Like elements are designated by like characters throughout the specification and drawings.

With particular reference now to the drawings and in the first instance to FIGURE 1, the numeral 10 designates an elongated cylindrical core. The core is shown as a hollow cylinder of metal. It should be understood that in accordance with principles of the invention, the core may be a solid or a hollow cylinder and may be fabricated from wood, plastic or other materials capable of maintaining a generally cylindrical shape during subsequent steps in the method.

In accordance with the present invention, a cord 11 has one end portion fixed to the outer wall of the cylinder, as illustrated by the bolt and nut assembly 12 passing through and fixed to the wall of the cylinder. After the cord 11 is fixed to the cylindrical core, an elongated strip of flexible material having a channel shape is positioned with an end portion 14 between the outer wall of the cylindrical core and the overlying cord 11 and in such a fashion that the cord enters the outwardly open channel formed by the elongated strip 13. The elongated strip 13 may have a cross section as illustrated in FIGURE 6 in which the channel has characteristic outwardly opening legs 15 and 16 and with a minor recess 17 formed in the bottom wall of the channel and of a size approaching that of the cross section of the cord. The recess may have a rounded or flat bottom as shown at 17a and 17b in FIGURE 7. The strip 13 may be formed from rubber, plastic or other materials capable of having an elongated linear disposition while being sufficiently flexible to enable simple winding of the strip around the cylindrical core 10. That is to say, the strip in its natural state should be sufficiently flexible to enable winding of the strip about the cylinder while the strip is capable of various transverse flexures to enable variance in the pitch of the strip as it is wound about and along the length of the cylinder.

It is preferable to feed the elongated strip into its underlying position to the cord 11 while a portion of the length of the strip is essentially linear as is represented in FIGURE 1.

When the strip end portion 14 is positioned against the outer wall of the cylindrical core and the cord 11 enters the channel of the strip, the cord and cylindrical core are wound together with the strip 13 after which the brush filaments 18 are positioned across the legs of the channel and between the channel and the cord as is represented in FIGURE 2. The filaments are positioned so that the midportions thereof are over the channel. The cord and strip may be wound for only a portion of a revolution of the core before the brush filaments are positioned, or the cord and strip may be wound for one revolution or more before the filaments are fed into contact with the channel if desired.

The winding of the cord and strip are continued with brush filaments being continuously positioned between the strip and the cord just prior to the time that the cord enters the space within the channel. As the cord is wound together with the channel, the cord engages the midportions of the brush filaments and forces them within the channel thus forcing the end portions of the filaments to extend outwardly from the channel in approximately radial directions with respect to the axis of the core as is illustrated in FIGURE 3.

The winding of the cord and strip together with the positioning of the filaments across the channel while forcing them to the outwardly extending position by the action of the cord continues with the strip 13 being wound in spiral fashion about the core until a desired number of convolutions of the spiral are formed at a desired pitch and in accordance with the predetermined desired length of the brush.

When the desired number of brush filaments are in position, the winding of the cord 11 and strip 13 may continue without positioning additional filaments therebetween for some distance whereupon the end of the cord 11 is again fixed to the core as by a suitable fastener such as the bolt 19 illustrated in FIGURE 5. Again, the channel and cord may pass around the core for a portion of a revolution or one revolution or more without filaments at this end of the brush.

The convolutions of the spirally wound strip 13 may be spaced in abutting relation to one another or may be spaced from one another as is illustrated in FIGURE 4. If it is desired to space the convolutions of the strip, a separate spacer strip 20 may be positioned between the convolutions of the filament holding strip 13 and wound about the core simultaneously with the winding of the strip 13. The introduction of a spacer strip is not necessary, however. After the brush is formed with the desired number of convolutions and filaments, the ends of the filaments may be trimmed, if necessary, and the brush assembly so formed is ready for use or mounting in some particular brush machine arrangement.

Through use of the method described herein, the same strip material may be used for brushes of various diameters, and lengths as well as with different core materials. The elongated strip 13 may be stored on a reel and fed into the winding relation, the strip being cut from the reel after the predetermined length of brush is formed. On the other hand, the strip may be cut to a desired length and then fed into the winding relation with the core and the cord. The formation of the brush may be done by hand through use of hand feeding of the strip, filaments and winding of the cord and core. The operations may be formed essentially simultaneously by a machine having facilities for producing the winding movement of the cord and strip with relation to the core. The winding movement may be accomplished by rotating the core or by winding the cord and strip about the core while the core is held essentially stationary.

In the assembled brush, the strip 13 is held in its proper position on the core solely by the action of the cord 11. Thus, the cord performs the dual function of holding the strip in position while at the same time holding the filaments in the proper, radially extending position and at the proper pitch.

It should be understood that where the term "cord" is used herein, it is intended to include various materials which will act to hold the channel strip in position while forcing the brush filaments into the channel and holding the filaments in position. Such materials include twine, metal wire, and cables of plastic, metal or equivalent material.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:
1. A method of making a spirally wound brush including the steps of fixing one portion of an elongated flexible cord to a generally cylindrical core, positioning one end portion of an elongated flexible channel on the core with the sides of the channel facing outwardly from the core, positioning brush filaments transversely of the channel, winding said channel in spiral fashion around the core, and winding said cord in spiral fashion and in overlying relation to said channel and filaments while between the sides of said channel in such fashion that the cord holds the channel in a predetermined spiral relation on said core and holds the filaments in position in said channel.

2. The method of claim 1 wherein said filaments are bent into outwardly extending relation by the conjoint action of the sides of said channel and said cord as said cord is wound.

3. A method of making a spirally wound brush including the steps of fixing one portion of an elongated flexible cord to a generally cylindrical core, positioning one end potrion of an elongated flexible channel on the core with the sides of the channel facing outwardly from the core, positioning brush filaments transversely of the core, winding said channel in spiral fashion around the core, winding said cord in spiral fashion and in overlying relation to said channel and filaments while between the sides of said channel in such fashion that the cord holds the channel in a predetermined spiral relation on said core and holds the filaments in position in said channel, and fixing a spacing strip between successive convolutions of the channel.

4. A method of making a spirally wound brush wherein the position and pitch of the spiral is not fixed by a prepositioned groove but is determined during the act of winding by the position of a holding cord and a separate, flexible, and unattached channel at the instant of contact between said channel and an elongated core, including the steps of winding a flexible channel about a core simultaneously with the winding of a holding cord about the core and in overlying relation to the channel and brush filaments carried by the channel while utilizing the cord to force and hold the channel against said core at a predetermined pitch and position.

5. The method of claim 4 wherein said brush filaments are fed between said channel and said cord prior to the time that said channel is forced against said core.

6. The method of claim 4 wherein the pitch of said channel is varied along the length of said core.

References Cited

UNITED STATES PATENTS

| | | | |
|---|---|---|---|
| 1,152,180 | 8/1915 | Jarvis | 15—182 |
| 2,281,412 | 4/1942 | Cave et al. | 15—182 |
| 2,553,748 | 5/1951 | Carlson et al. | 15—182 |
| 2,682,679 | 7/1954 | Ballard | 15—182 |
| 2,783,095 | 2/1957 | Ballard | 15—182 X |
| 2,812,214 | 11/1957 | Sandelin | 300—21 |
| 3,137,020 | 6/1964 | Tilgner | 15—182 X |

CHARLES A. WILLMUTH, *Primary Examiner.*

PETER FELDMAN, *Assistant Examiner.*